(12) United States Patent  (10) Patent No.: US 7,190,841 B2
Takahashi  (45) Date of Patent: Mar. 13, 2007

(54) IMAGE NOISE REDUCTION CIRCUIT

(75) Inventor: Hidetsugu Takahashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 750 days.

(21) Appl. No.: 10/338,759

(22) Filed: Jan. 9, 2003

(65) Prior Publication Data

US 2003/0138165 A1    Jul. 24, 2003

(30) Foreign Application Priority Data

Jan. 18, 2002   (JP) .............................. 2002-010517

(51) Int. Cl.
  *G06K 9/40*  (2006.01)
  *G06K 9/36*  (2006.01)
(52) U.S. Cl. ..................................... 382/254
(58) Field of Classification Search ................ 382/254, 382/274, 275; 348/241, 607, 620, 622, 627
  See application file for complete search history.

(56) References Cited

U.S. PATENT DOCUMENTS

| | | | | |
|---|---|---|---|---|
| 4,809,074 A | * | 2/1989 | Imaide et al. ............... | 348/241 |
| 5,005,081 A | * | 4/1991 | Asano ......................... | 348/622 |
| 5,159,450 A | * | 10/1992 | Senso et al. ................. | 348/623 |
| 5,161,018 A | * | 11/1992 | Matsunaga ................... | 348/620 |
| 5,200,824 A |   | 4/1993 | Kageyama | |
| 5,278,638 A | * | 1/1994 | Nakada et al. .............. | 348/607 |
| 5,715,000 A | * | 2/1998 | Inamori ....................... | 348/241 |
| 5,850,257 A | * | 12/1998 | Sakata ......................... | 348/241 |
| 6,204,890 B1 | * | 3/2001 | Kaneda ........................ | 348/607 |
| 6,760,067 B1 | * | 7/2004 | Sano et al. .................. | 348/241 |
| 6,882,754 B2 | * | 4/2005 | Hayashi ....................... | 382/275 |
| 6,999,633 B1 | * | 2/2006 | Kondo et al. ............... | 382/275 |
| 2001/0055428 A1 | * | 12/2001 | Hayashi ....................... | 382/274 |
| 2003/0138164 A1 | * | 7/2003 | Satou et al. ................. | 382/275 |

FOREIGN PATENT DOCUMENTS

| | | |
|---|---|---|
| JP | 62-290268 | 12/1987 |
| JP | 03-66230 | 3/1991 |
| JP | 4-81076 | 3/1992 |
| JP | 8130664 | 5/1995 |
| JP | 08-336156 | 12/1996 |
| JP | 2001-045335 | 2/2001 |

* cited by examiner

*Primary Examiner*—Amir Alavi
(74) *Attorney, Agent, or Firm*—Volentine & Whitt, P.L.L.C.

(57) ABSTRACT

An image noise reduction circuit includes an image correction portion which is responsive to a timing pulse signal to reduce a noise in an input image signal based on a difference data and to generate a corresponding output image signal, a difference detecting portion which generates the difference data corresponding to a difference between a first image data and a second image data where the first image data is contained in the input image signal and the second image data is contained in a preceding output image signal generated by the image correction portion, and a pulse generating portion which generates the timing pulse signal at a vertical blanking interval of the input image signal.

2 Claims, 6 Drawing Sheets

IMAGE NOISE REDUCTION CIRCUIT

BACKGROUND OF THE INVENTION

1. Field of the Invention

The present invention relates to, in general, an image display device and an image recording/replaying device and, more particularly, to an image noise reduction circuit for reducing noise in an image signal.

This is a counterpart of and claims priority to Japanese patent application Serial Number 010517/2002, filed Jan. 18, 2002, the subject matter of which is incorporated herein by reference.

2. Description of the Related Art

In Japanese Patent Publication Number "08-130664", Sakai discloses a conventional noise suppression system for image coder. The conventional noise suppression system has a block scanning circuit which applies block processing to each frame of a received image data. In the conventional noise suppression system, a received image data is subjected to the noise reduction by block, thus causing after-image or fog in a moving image area to be reduced and causing remaining noise in a still image area to be eliminated.

However, the conventional noise suppression system detects a noise during receiving an effective image data. Therefore, the conventional noise suppression system erroneously detects a moving component of the received image data or a high-frequency component occurred by a jitter as a noise, thus causing an accurate detection of noise to be difficult.

SUMMARY OF THE INVENTION

According to one aspect of the present invention, there is provided an image noise reduction circuit, including an image correction portion which is responsive to a timing pulse signal to reduce a noise in an input image signal based on a difference data and to generate a corresponding output image signal, a difference detecting portion which generates the difference data corresponding to a difference between a first image data and a second image data where the first image data is contained in the input image signal and the second image data is contained in a preceding output image signal generated by the image correction portion, and a pulse generating portion which generates the timing pulse signal at a vertical blanking interval of the input image signal.

The novel features of the invention will more fully appear from the following detailed description, appended claims and the accompanying drawings.

DETAILED DESCRIPTION OF THE PREFERRED EMBODIMENTS

The preferred embodiments of the present invention will be described. However, the invention is not limited to the specific embodiments. Moreover, not all the combinations of the characteristics of the present invention described in the embodiments are essential to the present invention.

Figure 1:
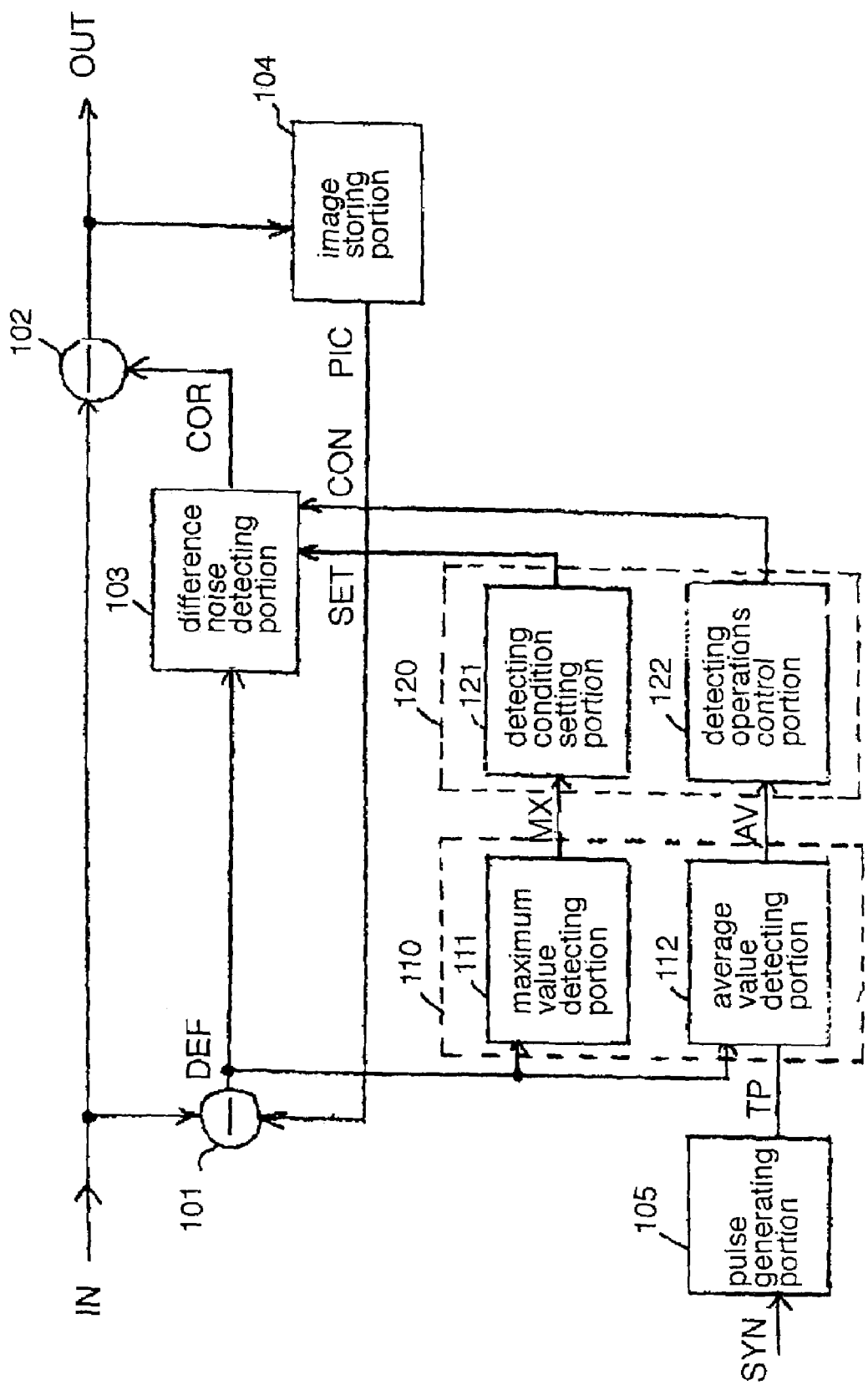
FIG. 1 is a block diagram showing an image noise reduction circuit according to a first preferred embodiment of the present invention.

An image noise reduction circuit according to a first preferred embodiment of the present invention will be described with reference to FIG. 1. FIG. 1 is a block diagram showing the image noise reduction circuit according to the first preferred embodiment of the present invention. The image noise reduction circuit comprises a difference detecting portion 101, an image correction portion (subtraction portion 102), a correction data generating portion (difference noise detecting portion 103), an image storing portion 104, a pulse generating portion 105, a noise detecting portion 110 and a noise reduction setting portion 120. The noise detecting portion 110 comprises a maximum value detecting portion 111 and an average value detecting portion 112. The noise reduction setting portion 120 comprises a detecting condition setting portion 121 and a detecting operations control portion 122.

The difference detecting portion 101 generates a difference data DEF corresponding to a difference between an input image signal IN and an image data PIC, wherein the input image signal IN is an input data frame, and the image data PIC is a preceding output frame stored in the image storing portion 104 which has been subjected to noise reduction. The difference data DEF is input to the difference noise detecting portion 103, to the maximum value detecting portion 111 and to the average value detecting portion 112. The difference noise detecting portion 103 generates a correction data COR from the difference data DEF based on a control signal CON and a setting information SET. The control signal CON and the setting information SET are output from the noise reduction setting portion 120. The correction data COR is used for a noise reduction process, and is input to the subtraction portion 102. The subtraction portion 102 subtracts the correction data COR from the input image signal IN, thus causing a noise component in the input image signal IN to reduce. The subtraction portion 102 generates an output image signal OUT which has been subjected to noise reduction. The output image signal OUT is stored in the image storing portion 104 each frame, and is used as the image data PIC. The pulse generating portion 105 inputs a synchronized signal SYN which is synchronized with the input image signal IN. The pulse generating portion 105 detects a vertical blanking interval of the synchronized signal SYN which shows an absence of an image data in the input image signal IN, and generates a timing pulse signal TP. The timing pulse signal TP has a pulse length for a certain period (for example, one line). The timing pulse signal TP is input to the maximum value detecting portion 111 and the average value detecting portion 112. The maximum value detecting portion 111 detects a maximum value MX of the difference data DEF while the timing pulse signal TP is active. The maximum value MX is input to the detecting condition setting portion 121. The average value detecting portion 112 detects an average value AV of the difference data DEF the timing pulse signal TP is active. The average value AV is input to the detecting operations control portion 122. The detecting condition setting portion 121 generates the setting information SET corresponding to the maximum value MX. The setting information SET is used to set an input-output characteristic of the difference noise detecting portion 103. That is, the setting information SET sets a slope of a noise detecting line in a low level region of the difference data DEF, a noise upper line in a middle level region and a slope of a noise convergence line in a high level region. The detecting operations control portion 122 generates the control signal CON corresponding to the average value AV. The control signal CON is used to control ON/OFF of the difference noise detecting portion 103. The control signal CON has a hysteresis characteristic. For example, when the average value AV is greater than a first threshold value TH1, the control signal CON has an ON state. The control signal CON keeps the ON state until the average value AV is less than a second threshold value TH2, even if the average value AV is less than the first threshold value TH1. When the average value AV is less than the second threshold value TH2, the control signal CON has an OFF state.

Figure 2:
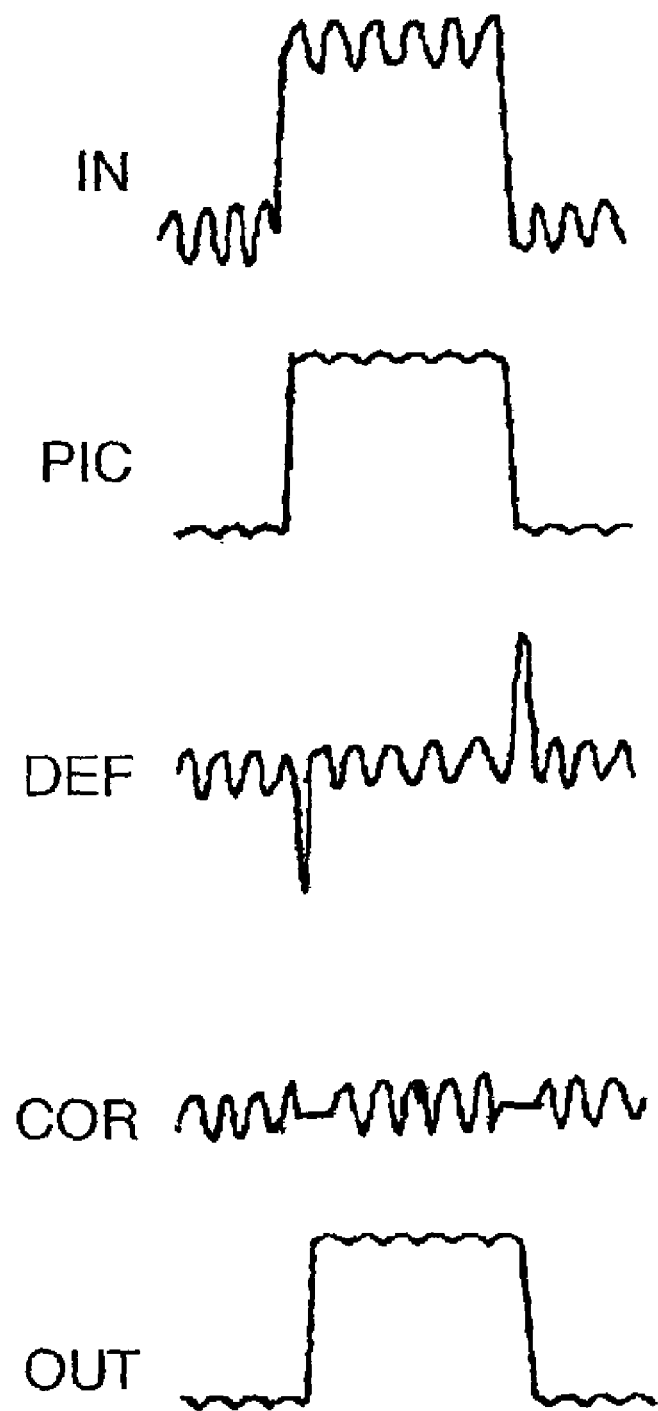
FIG. 2 is a wave form chart for explaining an operation of the image noise reduction circuit according to the first preferred embodiment of the present invention.
Figure 3:
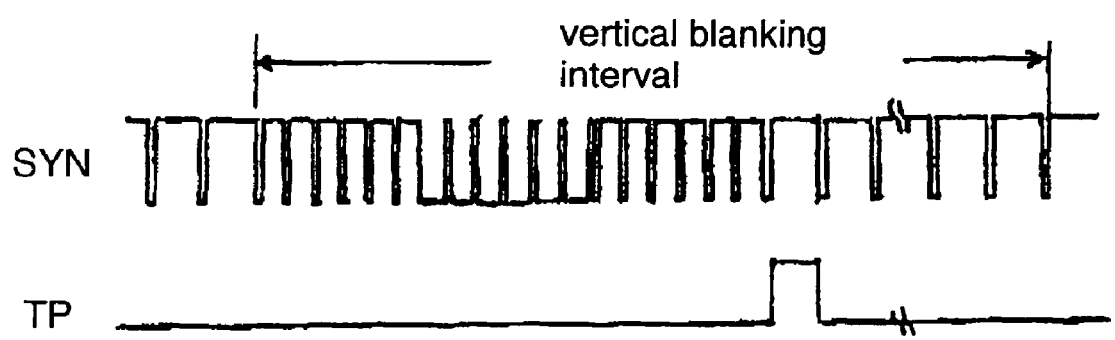
FIG. 3 is a timing chart diagram for explaining a relationship between a synchronized signal and a pulse signal.
Figure 4:
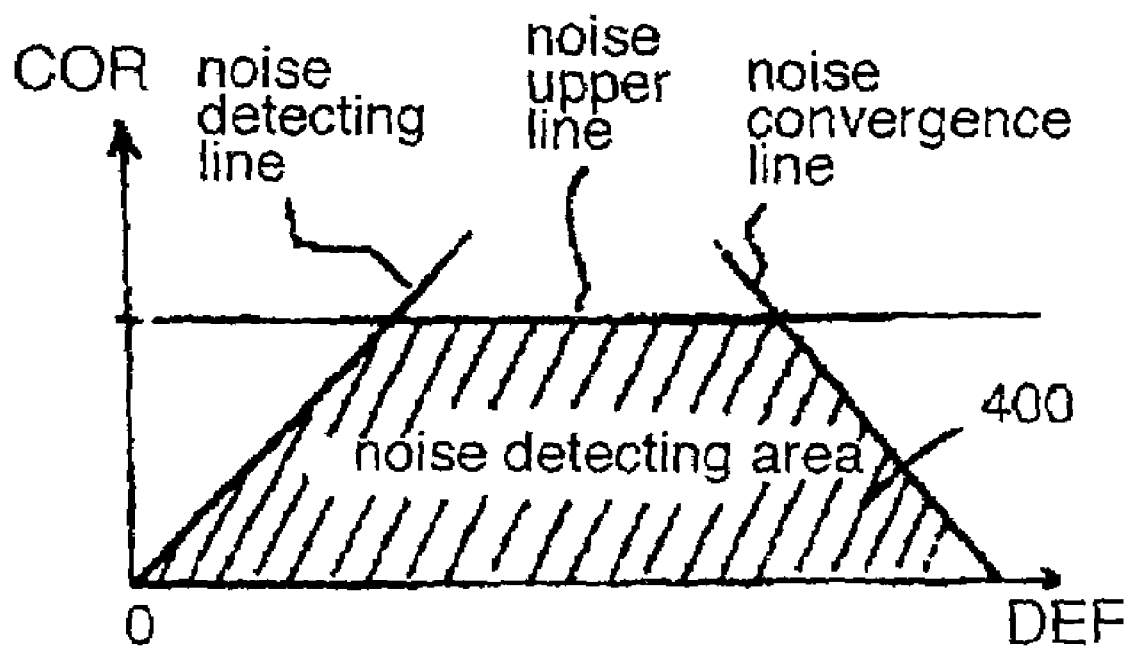
FIG. 4 is an input-output characteristic of a difference noise detecting portion according to the first preferred embodiment of the present invention.
Figure 5:
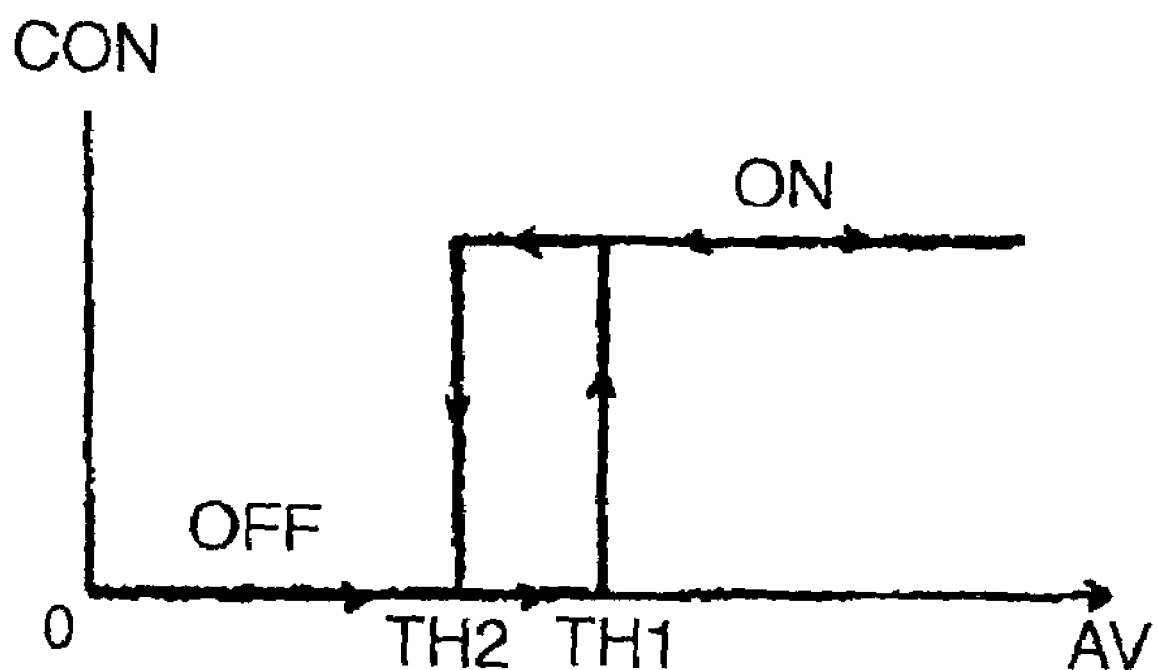
FIG. 5 is a state transition diagram for explaining an operation of a control signal CON according to the first preferred embodiment of the present invention.

Next, the operation of the image noise reduction circuit according to the first preferred embodiment of the present invention will be described with reference to FIGS. 1–5. FIG. 2 is a wave form chart for explaining an operation of the image noise reduction circuit according to the first preferred embodiment of the present invention. FIG. 3 is a timing chart diagram for explaining a relationship between a synchronized signal and a pulse signal. FIG. 4 is an input-output characteristic of a difference noise detecting portion according to the first preferred embodiment of the present invention. FIG. 5 is a state transition diagram for explaining an operation of a control signal CON according to the first preferred embodiment of the present invention.

The synchronized signal SYN is considered "active" during the vertical blanking interval. When the synchronized signal SYN is active, the pulse generating portion 105 generates the timing pulse signal TP having a pulse width corresponding to duration of one line of frame data. The timing pulse signal TP is input to the maximum value detecting portion 111 and to the average value detecting portion 112.

The difference detecting portion 101 inputs the input image signal IN and the image data PIC. The image data PIC is a preceding output frame stored in the image storing portion 104 and has been subjected to noise reduction. The difference detecting portion 101 generates the difference data DEF. As shown in FIG. 2, the difference data DEF has a difference between an image data of an input frame and that of a preceding frame. The difference is caused by an image motion between the input frame and the preceding frame. Also, the difference data DEF has a noise in the input image signal IN. The difference data DEF is input to the difference noise detecting portion 103, to the maximum value detecting portion 111 and to the average value detecting portion 112. The maximum value detecting portion 111 detects a maximum value MX of the difference data DEF while the timing pulse signal TP is activate. The maximum value MX is input to the detecting condition setting portion 121. The detecting condition setting portion 121 generates the setting information SET corresponding to the maximum value MX. As shown in FIG. 4, the setting information SET comprises the noise detecting line, the noise upper line and the noise convergence line. Therefore, a value of the difference data DEF is output under a noise detecting area 400 which is surrounded with the three lines. The average value detecting portion 112 detects an average value AV of the difference data DEF while the timing pulse signal TP is activate. The average value AV is input to the detecting operations control portion 122. The detecting operations setting portion 122 generates the control signal CON corresponding to the average value AV. The control signal CON has a hysteresis characteristic. For example, when the average value AV is greater than a first threshold value TH1, the control signal CON has an ON state. The control signal CON keeps the ON state until the average value AV is less than a second threshold value TH2, even if the average value AV is less than the first threshold value TH1. When the average value AV is less than the second threshold value TH2, the control signal CON has an OFF state.

The difference noise detecting portion 103 inputs the difference data DEF, the setting information SET and the control signal CON. When noise is little, the control signal CON has an OFF state, and the difference noise detecting portion 103 is inactive. In this case, the subtraction portion 102 outputs the input image signal IN as the output image signal OUT. Otherwise, when noise is much, the control signal CON has an ON state, and the difference noise detecting portion 103 is active. In this case, the difference noise detecting portion 103 outputs the correction data COR under a noise detecting area 400. The correction data CON is input to the subtraction portion 102. The subtraction portion 102 corrects the input image signal IN based on the correction data COR and outputs the output image signal OUT which has been subjected to noise reduction. The output image signal OUT is input to the image storing portion 104 and is output as the image data PIC which is used for being compared with the next input frame data to reduce noise.

The image noise reduction circuit according to the first preferred embodiment of the present invention has the maximum value detecting portion 111 and the average value detecting portion 112, which detects noise of the input image signal IN during the vertical blanking interval. That is, when an image component is absent, the image noise reduction circuit according to the first preferred embodiment detects the noise of the input image signal IN. Therefore, the image noise reduction circuit according to the first preferred embodiment detects the noise correctly, accurately, and reduces the noise according to the noise level.

Furthermore, the image noise reduction circuit according to the first preferred embodiment has the detecting operations control portion. When noise is little, the detecting operations control portion outputs the control signal to cause the difference noise detecting portion to be inactive. Therefore, when noise is little, the image noise reduction circuit according to the first preferred embodiment prevents after-image or blurring which occurs because of the noise reduction process, and keeps the high-definition images.

Figure 6:
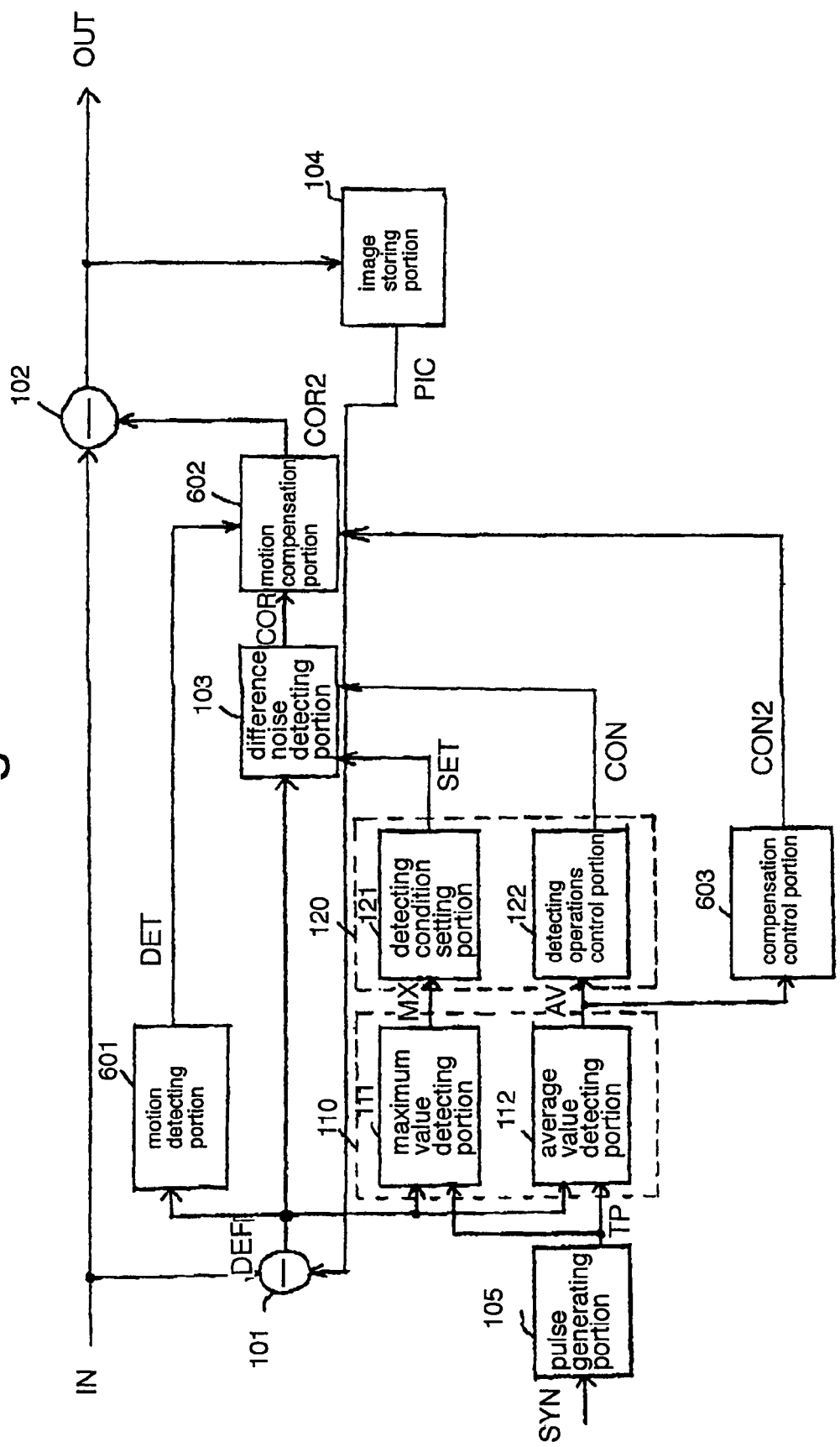
FIG. 6 is a block diagram showing an image noise reduction circuit according to a second preferred embodiment of the present invention.

An image noise reduction circuit according to a second preferred embodiment of the present invention will be described with reference to FIG. 6. FIG. 6 is a block diagram showing the image noise reduction circuit according to the second preferred embodiment of the present invention. Like elements are given like or corresponding reference numerals in the first and second preferred embodiments. Thus, dual explanations of the same elements are avoided.

The image noise reduction circuit comprises the difference detecting portion 101, the image correction portion (subtraction portion 102), the correction data generating portion (difference noise detecting portion 103), the image storing portion 104, the pulse generating portion 105, the noise detecting portion 110, the noise reduction setting portion 120, a motion detecting portion 601, a motion compensation portion 602 and a compensation control portion 603.

The motion detecting portion 601 detects an image motion corresponding to a picture element next to the difference data DEF which is output from the difference detecting portion 101. The motion detecting portion 601 outputs a decision signal DET which shows whether or not there is the motion to the motion compensation portion 602.

The motion compensation portion 602 is provided between the difference noise detecting portion 103 and the subtraction portion 102. When both of the decision signal DET and a control signal CON2 are active, the motion compensation portion 602 generates a correction data COR2 based on the correction data COR. The correction data COR2 is input to the subtraction portion 102 and is used to compensate the input image signal IN. That is, the correction data COR2 is used not to treat the image motion between the input image signal and the preceding image signal as a noise.

The compensation control portion 603 generates a control signal CON2 based on the average value AV, wherein the control signal CON2 is used to control ON/OFF of the motion compensation portion 602. That is, when noise is not much, the control signal CON2 causes the motion compensation portion 602 to be active. When noise is much, the control signal CON2 causes the motion compensation portion 602 to be inactive. The control signal CON2 has a hysteresis characteristic. For example, when the average value AV is greater than a first threshold value, the control signal CON2 has an OFF state. The control signal CON2 keeps the OFF state until the average value AV is lower than a second threshold value, even if the average value AV is lower than the first threshold value. When the average value AV is lower than the second threshold value, the control signal CON2 has an ON state. The threshold values of the compensation control portion 603 are higher than the threshold values of the detecting operations control portion 122.

That is, when the average value AV is reduced, the control signal CON has an OFF state and the control signal CON2 has an ON state, thus causing the input image signal IN not to be subjected to noise reduction by the difference noise detecting portion 103 and to be subjected to motion compensation by the motion compensation portion 602. When the average value AV is not reduced or increased, both of the control signals CON and CON2 are ON states, thus causing the input image signal IN to be subjected to noise reduction by the difference noise detecting portion 103 and to motion compensation by the motion compensation portion 602. When the average value AV is increased, the control signal CON has the ON state and the control signal CON2 has the OFF state, thus causing the input signal to be subjected to noise reduction by the difference noise detecting portion 103 and not to be subjected to motion compensation by the motion compensation portion 602.

The image noise reduction circuit according to the second preferred embodiment of the present invention has the maximum value detecting portion 111 and the average value detecting portion 112, which detects noise of the input image signal IN during the vertical blanking interval. That is, when an image component is absent, the image noise reduction circuit according to the second preferred embodiment detects the noise of the input image signal IN. Therefore, the image noise reduction circuit according to the second preferred embodiment detects the noise correctly, accurately, and reduces the noise according to the noise level.

Furthermore, the image noise reduction circuit according to the second preferred embodiment has the detecting operations control portion. When noise is little, the detecting operations control portion outputs the control signal to cause the difference noise detecting portion to be inactive. Therefore, when noise is little, the image noise reduction circuit according to the second preferred embodiment prevents after-image or blurring which occurs because of the noise reduction process, and keeps the high-definition images.

In addition, the image noise reduction circuit according to the second preferred embodiment has the motion compensation portion 602 and the compensation control portion 603. Therefore, the image noise reduction circuit according to the second preferred embodiment compensates the image motion.

While the preferred form of the present invention has been described, it is to be understood that modifications will be apparent to those skilled in the art without departing from the spirit of the invention. For example, the maximum value detecting portion 111 detects the maximum value MX while the pulse timing signal TP is active. However, an average value of the maximum values of a plurality of serial frames which have been received may be used instead of the maximum value MX. In this case, even if the noise is suddenly occurred, the image noise reduction circuit prevents picture from distorting. For example, the average value detecting portion 112 detects the average value AV while the pulse timing signal TP is active. However, an average value of the average values of a plurality of serial frames which have been received may be used instead of the average value AV. In this case, even if the noise is suddenly occurred, the image noise reduction circuit prevents picture from distorting. For example, each of the detecting operations control portion 122 and the compensation control portion 603 has a hysteresis characteristic. However, their circuits have comparison circuits instead of the hysteresis characteristic. For example, the image noise reduction circuit may decide whether or not the noise of a color-difference signal is accurate corresponding to the noise of a luminance signal of the input image data. Even if a data signal is multiplexed in the vertical blanking interval, the image noise reduction circuit prevents erroneously detecting the signal as the noise. For example, the setting information SET has been calculated corresponding to the maximum value MX. However, the detecting condition setting portion 121 may have a plurality of setting information SET which one of is selected corresponding to the maximum value MX. For example, when an interlace method is applied, the input image signal IN may be subjected to noise reduction by filed. For example, when the control signal CON2 is inactive, the motion compensation portion 602 does not completely stop doing noise reduction, but may reduce ability to do noise reduction. For example, the average value detecting portion 112 has one average value. However, the average value detecting portion 112 has a plurality of average values, and the noise reduction process and the motion compensation process may be done corresponding to levels of the average values.

The scope of the invention, therefore, is to be determined solely by the following claims.

What is claimed:

1. An image noise reduction circuit, comprising:
   an image storing portion which stores a latest image data from an output image signal which has been subjected to noise reduction by frame;
   a difference detecting portion which detects a difference between an input image signal and the stored image data, and which outputs a difference data;

a pulse generating portion which detects a timing at which there is an absence of an image component in the input image signal based on a synchronized signal, and which generates a timing pulse signal;
a noise detecting portion which detects a noise level in the difference data responsive to the timing pulse signal;
a noise reduction setting portion which generates a control data based on the noise level;
a correction data generating portion which generates a correction data from the difference data based on the control data; and
an image correction portion which corrects the input image signal using the correction data, and which outputs the output image signal,
wherein said noise detecting portion comprises a maximum detecting portion which detects a maximum value of the difference data and an average detecting portion which detects an average value of the difference data, and wherein said noise level comprises the maximum value and the average value, and
wherein said noise reduction setting portion comprises a detecting condition setting portion which generates a setting information based on the maximum value and a detecting operations control portion which generates a control signal, and wherein said control data comprises the setting information and the control signal.

2. An image noise reduction circuit, comprising:
an image storing portion which stores a latest image data from an output image signal which has been subjected to noise reduction by frame;
a difference detecting portion which detects a difference between an input image signal and the stored image data, and which outputs a difference data;
a moving detecting portion which detects a moving image between the input image signal and the stored image data responsive to the difference data;
a pulse generating portion which detects a timing at which there is an absence of an image component in the input image signal based on a synchronized signal, and which generates a timing pulse signal;
a noise detecting portion which detects a noise level in the difference data responsive to the timing pulse signal;
a noise reduction setting portion which generates a control data based on the noise level;
a correction data generating portion which generates a first correction data from the difference data based on the control data;
a moving compensation portion which generates a second correction data, wherein the second correction data is the first correction data which has been subjected to moving compensation based on a control signal;
a compensation control portion which generates the control signal based on the noise level; and
an image correction portion which corrects the input image signal using the second correction data, and which outputs the output image signal,
wherein said control signal is a first control signal, wherein said noise detecting portion comprises a maximum detecting portion which detects a maximum value of the difference data and an average detecting portion which detects an average value of the difference data, and wherein said noise level comprises the maximum value and the average value, and
wherein said noise reduction setting portion comprises a detecting condition setting portion which generates a setting information based on the maximum value and a detecting operations control portion which generates a second control signal, and wherein said control data comprises the setting information and the second control signal.

* * * * *